United States Patent
Rosca et al.

(10) Patent No.: US 10,920,769 B2
(45) Date of Patent: Feb. 16, 2021

(54) PUMP CLOUD-BASED MANAGEMENT AND CONTROL TECHNIQUE CUSTOMIZED HYDRONIC COMPONENTS

(71) Applicant: FLUID HANDLING LLC., Morton Grove, IL (US)

(72) Inventors: Florin Rosca, Niles, IL (US); James J. Gu, Buffalo Grove, IL (US); Taifur Rahman, Skokie, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 15/812,555

(22) Filed: Nov. 14, 2017

(65) Prior Publication Data

US 2018/0320684 A1 Nov. 8, 2018

Related U.S. Application Data

(60) Provisional application No. 62/421,593, filed on Nov. 14, 2016.

(51) Int. Cl.
*F04B 49/20* (2006.01)
*F04D 15/00* (2006.01)
(Continued)

(52) U.S. Cl.
CPC ............ *F04B 49/20* (2013.01); *F04B 49/065* (2013.01); *F04B 51/00* (2013.01); *F04D 13/06* (2013.01);
(Continued)

(58) Field of Classification Search
CPC .......... F04B 49/20; F04B 51/00; F04D 13/06; F04D 15/0066; F04D 15/0088; G05B 19/05
See application file for complete search history.

(56) References Cited

U.S. PATENT DOCUMENTS 5,540,555 A   7/1996   Corso et al.
6,178,393 B1  1/2001   Irvin
(Continued)

FOREIGN PATENT DOCUMENTS

CN   103016321 A   4/2013
CN   202851391 U   4/2013
(Continued)

OTHER PUBLICATIONS

Wikipedia article about OPC, [online], Oct. 2016, [retrieved on Feb. 8, 2019]. Retrieved from <https://web.archive.org/web/20161018191407/https://en.wikipedia.org/wiki/Open_Platform_Communications> (Year: 2016).*

(Continued)

*Primary Examiner* — Thomas C Lee
*Assistant Examiner* — Charles Cai
(74) *Attorney, Agent, or Firm* — Ware, Fressola, Maguire & Barber LLP

(57) ABSTRACT

A pumping system featuring a pump, motor, a bearing assembly, integrated data acquisition system and combined programmable logic controller (PLC), data acquisition and modem. The pump couples to a pump shaft that responds to a pump shaft force to pump a liquid. The motor couples to the pump shaft, responds to VFD/VSD control signaling and provides the pump shaft force to drive the pump shaft. The bearing assembly includes a bearing with the pump shaft arranged therein and couples the pump and the motor. The variable frequency/speed drive (VFD/VSD) receives PLC control signaling and provides the VFD/VSD control signaling to drive the motor. The integrated data acquisition system responds to PLC data acquisition signaling, and provides integrated data acquisition system signaling containing information about an integrated set of pumping system parameters related to the pump, the bearing assem- (Continued)

Sensor Placement bly, the motor and the VFD/VSD in the pump system. The combined programmable logic controller (PLC), data acquisition and modem provides the PLC data acquisition signaling and receive the integrated data acquisition signaling, provides PLC data acquisition modem signaling that exports performance data to the Internet to allow remote manual monitoring of the pump system, and provides the PLC control signaling to control the VFD/VSD and operate the pumping system as a controlled, closed loop system.

15 Claims, 7 Drawing Sheets

(51) Int. Cl.
*F04D 13/06* (2006.01)
*G05B 19/05* (2006.01)
*F04B 49/06* (2006.01)
*F04B 51/00* (2006.01)
*G05B 23/02* (2006.01)

(52) U.S. Cl.
CPC ..... *F04D 15/0066* (2013.01); *F04D 15/0088* (2013.01); *G05B 19/05* (2013.01); *G05B 19/058* (2013.01); *F04B 2203/0205* (2013.01); *F04B 2203/0206* (2013.01); *F04B 2205/09* (2013.01); *G05B 23/0283* (2013.01); *G05B 2219/14006* (2013.01)

(56) References Cited

U.S. PATENT DOCUMENTS

| | | | |
|---|---|---|---|
| 6,260,004 B1* | 7/2001 | Hays | G05B 23/0235 702/130 |
| 6,330,525 B1 | 12/2001 | Hays et al. | |
| 7,979,240 B2 | 7/2011 | Fielder | |
| 8,480,374 B2 | 7/2013 | Yang | |
| 8,662,859 B2 | 3/2014 | Gonnella et al. | |
| 8,914,300 B2 | 12/2014 | Sustaeta et al. | |
| 9,013,322 B2 | 4/2015 | Roberson et al. | |
| 9,074,587 B2 | 7/2015 | Atchia | |
| 9,296,009 B2 | 3/2016 | Bacco et al. | |
| 9,404,500 B2 | 8/2016 | Stiles, Jr. et al. | |
| 9,426,452 B2 | 8/2016 | Amiri et al. | |
| 10,107,295 B1* | 10/2018 | Brecheisen | E21B 43/126 |
| 2005/0123408 A1 | 6/2005 | Koehl | |
| 2007/0175633 A1 | 8/2007 | Kosmala et al. | |
| 2009/0087319 A1 | 4/2009 | Russold et al. | |
| 2009/0210081 A1* | 8/2009 | Sustaeta | G05B 13/0285 700/99 |
| 2010/0228398 A1 | 9/2010 | Powers et al. | |
| 2011/0251938 A1 | 10/2011 | Margonis et al. | |
| 2012/0197852 A1* | 8/2012 | Dutta | H04L 67/2804 707/692 |
| 2012/0246268 A1* | 9/2012 | Richeson | G01D 4/004 709/217 |
| 2013/0272898 A1 | 10/2013 | Toh et al. | |
| 2013/0290496 A1* | 10/2013 | Sagues | H04L 41/0803 709/220 |
| 2013/0306276 A1 | 11/2013 | Duchesneau | |
| 2014/0324217 A1 | 10/2014 | Barker | |
| 2015/0078917 A1 | 3/2015 | Torrey et al. | |
| 2015/0148971 A1 | 5/2015 | Acker | |
| 2016/0047372 A1 | 2/2016 | Nielsen et al. | |
| 2016/0094421 A1 | 3/2016 | Bali et al. | |
| 2016/0301991 A1 | 10/2016 | Loychik et al. | |
| 2016/0334810 A1 | 11/2016 | Koehl | |
| 2016/0381071 A1 | 12/2016 | Tatourian et al. | |

FOREIGN PATENT DOCUMENTS

| | | |
|---|---|---|
| CN | 104412189 A | 3/2015 |
| CN | 105673467 A | 6/2016 |
| CN | 105676835 A | 6/2016 |
| CN | 105782072 A | 7/2016 |
| CN | 106015028 A | 10/2016 |
| EP | 0929745 A1 | 7/1999 |
| EP | 2 852 173 A1 | 3/2015 |
| WO | 2009076565 A1 | 6/2009 |
| WO | 2012033880 A1 | 3/2012 |
| WO | 2012149981 A1 | 11/2012 |
| WO | 2013040853 A1 | 3/2013 |
| WO | 2013/155421 A1 | 10/2013 |

OTHER PUBLICATIONS

Burger, Brett, "How IIOT Monitoring Improves Pump Maintenance," Flow Control, flowcontrolnetwork.com, Jul. 11, 2016. http://www.flowcontrolnetwork.com/how-iiot-monitoring-improves-pump-maintenance/.
"Grundfos E-Circulators for Optimizing Pumping System Design TPE and LME," Grundfos, grundfos.com, Mar. 2006. http://noteswww.grundfos.com/web/homecbs_us.nsf/GratikOpslag/Aircon_brochure/File/L-EC-SL-001%20TPE%20E-Circulator%20Broch.pdf.
"SelfSensing Series with ProBalance®," Taco® Comfort Solutions™, taco-hvac.com, Jul. 8, 2014. https://web.archive.org/web/20140708222556/http://www.taco-hvac.com/products/variable_speed_products/selfsensing_series/index.html.
Lv, Hongqiang, et al. "An Energy Saving System for a Beam Pumping Unit," Sensors 16.5 May 13, 2016, p. 685. http://www.mdpi.com/1424-8220/16/5/685/htm.
Chuang, Y. C., et al. "Implementation of Big Data Processing for Intelligent Rotating Machinery System," Nov. 13, 2015. http://www.sti-expert.com/assets/Docs/Automation%202015-0001_Implementation%20of%20Big%20Data%20Processing%20for%20Intelligent%20Rotating%20Machinery%20System.pdf.
Lim, Hyun Sung, In Ho Ryu, and Jun Ho Bang. "Smart Emergency Generator Monitoring System through IoT using IEC 61850." Indian Journal of Science and Technology 9.44, Nov. 2016. http://www.indjst.org/index.php/indjst/article/viewFile/105160/75301.
Rink, Matthias, and Aymeric Goldsteinas. "The Power of PdMetrics: Optimizing Operations with Predictive Maintenance," accessed Jan. 2017. http://www.ipsen.de/EN/Documents/Ipsen-Europe/English/PdMetrics_EN.pdf.
"SelfSensing Series with ProBalance™ with iWorx ProView™," Taco® Comfort Solutions™, tacohvac.com, May 17, 2014. https://web.archive.org/web/20140517114240/http://www.tacohvac.com/selfsensing_series_with_iworx/index.html.
English language Abstract of WO2013040853.
European Search Report issued in corresponding EP application No. 17869696.9; dated May 12, 2020.
English language Abstract of CN202851391.
English language Abstract of CN106015028.
English language Abstract of CN105782072.
English language Abstract of CN105676835.
English language Abstract of CN105673467.
English language Abstract of CN104412189.
English language Abstract of CN103016321.

\* cited by examiner

Figure 1: Typical Pump Assembly (Prior art)

Figure 2: Sensor Placement

Figure 5: Pump Assembly with VFD Support Bracket

Figure 6
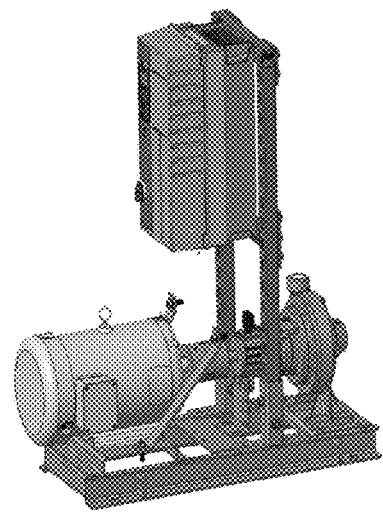
Fig. 6A
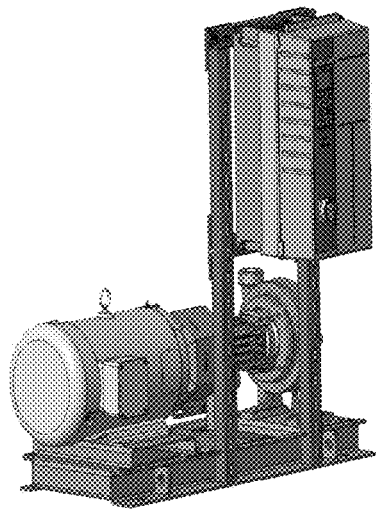
Fig. 6B
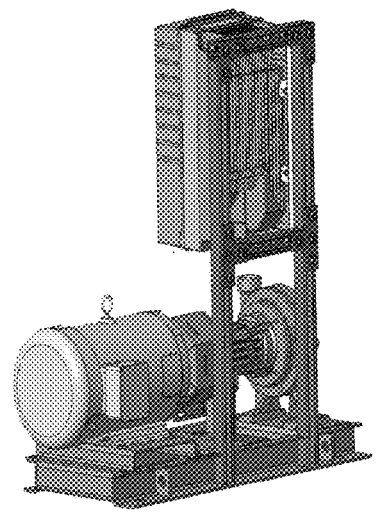
Fig. 6C
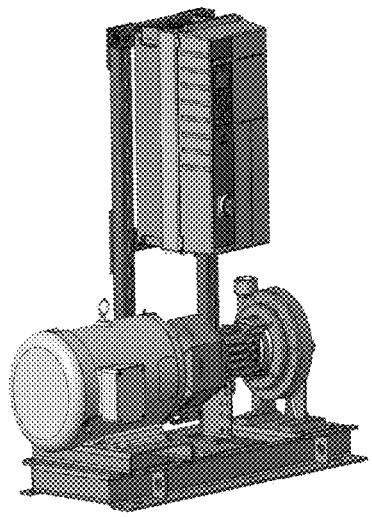
Fig. 6D
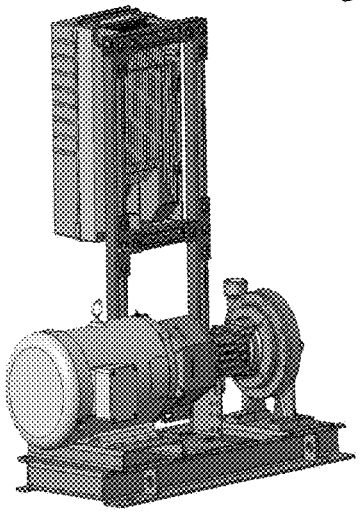
Fig. 6E Combined PLC, data acquisition and modem 10

Signal processor 10a configured at least to:

provide PLC data acquisition signaling and receive integrated data acquisition signaling, e.g., back from motor, pump and bearing assembly sensors, as well as from the VFD/VSD;

provide PLC data acquisition modem signaling that exports performance data to the Cloud and/or Internet to allow remote manual monitoring of the pump system, e.g., including in response to cloud-based PLC data acquisition modem request signaling received from the Cloud and/or Internet; and provide PLC control signaling to control the VFD/VSD and operate the pumping system as a controlled, closed loop system, e.g., including in response to cloud-based VFD/VSD control signaling received from the Cloud and/or Internet.

Other signal processor circuits, circuitry, or components 10b that do not form part of the underlying invention, e.g., including input/output modules/modems, one or more memory modules (e.g., RAM, ROM, etc.), data, address and control busing architecture, etc.

Figure 7

PUMP CLOUD-BASED MANAGEMENT AND CONTROL TECHNIQUE CUSTOMIZED HYDRONIC COMPONENTS

CROSS-REFERENCE TO RELATED APPLICATION

This application claims benefit to provisional patent application Ser. No. 62/421,593, filed 14 Nov. 2016, which is hereby incorporated by reference in its entirety.

BACKGROUND OF THE INVENTION

1. Field of the Invention

The present invention relates to a pumping system.

2. Brief Description of Related Art

In a typical pumping system, electricity is supplied via the mains line to an induction motor which is mechanically coupled to a pump. Most often the pumping system is designed to meet the worst case system requirements of the application with regards to flow-rate and pressure head. FIG. 1 outlines a typical pump assembly/unit. Since the rotational speed of an induction motor is directly related to the electrical frequency coming from the mains supply, reductions in demand result in relatively small reductions in the power consumption of the system. In order to realize significant energy savings with demand reduction the electrical frequency of the electricity being supplied to the induction motor must be reduced. This is done using a device known as a variable frequency/speed drive (VFD/VSD).

A VFD/VSD is typically purchased separately from the rest of the pumping system and can be controlled manually or by connecting it to an array of sensors and programming it with a set of instructions. VFD/VSDs can also be an integral part of a pumping system and can be controlled via internal programming and factory calibration.

Shortcomings of Prior Art

When a pumping system is outfitted with a VFD/VSD that uses external sensors, care must be taken when installing the sensors in the piping system. If, for example, a paddlewheel type flow meter is installed before the fluid flow is fully developed it will produce inaccurate readings which will affect the performance of the pumping system. There are several other considerations that must be taken into account including sensor accuracy, calibration, resolution, etc.

Another shortcoming with this system is that the sensor data is typically fed only to the VFD/VSD and the user is unaware of what is actually happening in their system. This can lead to improper pumping system operation due to a mis-calibrated or faulty sensor within the system.

Using a VFD/VSD driven pumping system that incorporates internal programming and factory calibration can alleviate the issues that arise when using external sensors but suffers from the fact that the information it is using does not take into account component degradation and is blind to system faults.

SUMMARY OF THE INVENTION

In summary, the patent application sets forth the integration of sensors within a pumping system to create a controlled, closed loop system that accurately controls the VFD/VSD, exports performance data to the Internet to allow remote manual monitoring, provides predictive/prescriptive monitoring of the pump units status and sends alerts or maintenance requests when necessary.

By way of example, and according to some embodiments, the present invention may include, or take the form of, a pumping system featuring a new and unique combination of a pump, a motor, a bearing assembly, an integrated data acquisition system and combined programmable logic controller (PLC), data acquisition and modem.

The pump may be coupled to a pump shaft configured to respond to a pump shaft force applied to pump a liquid.

The motor may be coupled to the pump shaft and configured to respond to VFD/VSD control signaling and provide the pump shaft force applied to drive the pump shaft.

The bearing assembly may include a bearing with the pump shaft arranged therein and is configured to couple the pump and the motor.

The variable frequency/speed drive (VFD/VSD) may be configured to receive PLC control signaling, and provide the VFD/VSD control signaling to drive the motor.

The integrated data acquisition system may be configured to respond to PLC data acquisition signaling, and provide integrated data acquisition system signaling containing information about an integrated set of pumping system parameters related to the pump, the bearing assembly, the motor and the VFD/VSD in the pump system.

The combined programmable logic controller (PLC), data acquisition and modem may be configured to:
provide the PLC data acquisition signaling and receive the integrated data acquisition signaling, e.g., back from motor, pump and bearing assembly sensors, as well as from the VFD/VSD,
provide PLC data acquisition modem signaling that exports performance data to the Internet and/or Cloud to allow remote manual monitoring of the pump system, e.g., including in response to cloud-based PLC data acquisition modem request signaling received from the Internet and/or Cloud, and
provide the PLC control signaling to control the VFD/VSD and operate the pumping system as a controlled, closed loop system, e.g., including in response to cloud-based VFD/VSD control signaling received from the Internet and/or Cloud.

The pumping system may include one or more of the following features:

The integrated data acquisition system may include integrated sensors, including:
pump pressure, temperature and flow sensors coupled to the pump, and configured to respond to the PLC data acquisition signaling and provide pump pressure, temperature and flow integrated sensor signaling containing information about one or more pressures, temperature or flows sensed in relation to the pump;
bearing assembly temperature and vibration sensors coupled to the bearing assembly, and configured to respond to the PLC data acquisition signaling and provide bearing assembly temperature and vibration integrated sensor signaling containing information about one or more temperatures or vibrations sensed in relation to the bearing assembly; and
motor temperature and vibration sensors coupled to the motor, and configured to respond to the PLC data acquisition signaling and provide motor temperature and vibration integrated sensor signaling containing information about one or more temperatures or vibrations sensed in relation to the motor.

The pumping system may include an array of communication devices, including one or more Supervisory Control and Data Acquisition (SCADA-based) devices, Computer device, advanced metering infrastructures (AMI-based), Open Platform Communication (OPC-based) devices, Dataloggers; and the integrated sensors on the pump, the motor, the bearing assembly are connected via the combined programmable logic controller (PLC), data acquisition and modem to the array of communication devices.

The VFD/VSD may be configured to respond to the PLC data acquisition signaling and provide VFD/VSD data acquisition signal, including the VFD/VSD control signaling, back to the combined programmable logic controller, data acquisition and modem.

The pumping system may be configured to couple to the Cloud for remote monitoring and control, including where the pumping system forms part of a building, and the Cloud and/or Internet includes a building management system to monitor and control the pumping system remotely.

The combined programmable logic controller (PLC), data acquisition and modem may be configured to respond to cloud-based PLC data acquisition modem request signaling, e.g., received from the Cloud and/or Internet; and provide the PLC data acquisition modem signaling that exports performance data to the Internet to allow the remote manual monitoring of the pump system.

The pumping system may include a cloud-based VFD/VSD controller configured to receive the PLC data acquisition modem signaling; and provide cloud-based VFD/VSD control signaling containing information to control the VFD/VSD and operate the pumping system as the controlled, closed loop system.

The combined programmable logic controller (PLC), data acquisition and modem may be configured to respond to the cloud-based VFD/VSD control signaling, e.g., received from the Cloud and/or Internet; and provide the PLC control signaling to control the VFD/VSD and operate the pumping system as the controlled, closed loop system.

The building management system, e.g. in the Cloud and/or Internet, may be configured to receive user commands, including commands to start, stop or adjust some part of the pump system.

The building management system, e.g., in the Cloud and/or Internet, may be configured to receive user commands, including commands to allow a user to monitor run hours, pump speed, and/or pumping system pressure in the pumping system.

The pumping system may be coupled to a pumping system condition monitoring device configured to receive the PLC data acquisition modem signaling, and provide pumping system condition monitoring signaling containing information about condition monitoring and analysis results about the pumping system, including providing predictive/prescriptive monitoring of pump statuses and sending alerts or maintenance requests.

The pumping system condition monitoring device may be configured to monitor the status of the pump, the motor or bearing assembly and compare the status to pump, motor or bearing assembly historical data to provide predictive/prescriptive analysis for the user to make determinations regarding the maintenance of the pump, the motor or bearing assembly.

The pumping system may include, or take the form of, an HVAC system, a potable water system, a fire suppression system, or a building system.

Cloud-Based Pumping System Monitoring and Control System

According to some embodiments, the present invention may include, or take the form of, a cloud-based pumping system monitoring and control system for remotely monitoring and controlling at least one pump, e.g., featuring:

at least one pump having a variable speed drive (VSD) and integrated sensors for monitoring pump parameters, and for providing integrated sensor signaling containing information about pump parameters sensed for the at least one pump, including run hours, speed and system pressure;

a bi-directional network for communicating the integrated sensor signaling, and for receiving remote variable speed drive control signaling for controlling the variable speed drive for the at least one pump; and a remote cloud-based server having a historical database containing historical pump parameter data for the at least one pump, configured to receive the integrated sensor signaling, compare the pump parameters received to the historical pump parameter data stored for each the at least one pump, and provide the remote variable speed drive control signaling for controlling the variable speed drive for the at least one pump in a controlled closed loop system that allows remote user manual monitoring using predictive/prescriptive monitoring algorithms, including starting or stopping the at least one pump, making adjustments to pump control settings, and sending alerts or maintenance requests, when needed.

According to some embodiments, the at least one pump may include multiple pumps; and/or the bi-directional network may include a supervisory control and data acquisition (SCADA) coupled to the at least one pump, and an advanced metering infrastructure (AMI) coupled to the SCADA for providing cloud-based SCADA/AMI signaling for communicating the integrated sensor signaling, and for receiving the remote variable speed drive control signaling for controlling the variable speed drive for the at least one pump.

BRIEF DESCRIPTION OF THE DRAWING

The drawing, which is not necessarily drawn to scale, includes the following Figures:

FIG. 6 includes FIGS. 6A thru 6E and show five (5) different pump/pumping assembly with a VFD/VSD support bracket having a sensor control panel and VFD/VSD mounted thereon, according to some embodiments of the present invention.

FIG. 7 shows a combined PLC, data acquisition and modem having a signal processor and other circuits, circuitry or components for implementing the signal processing functionality, according to some embodiments of the present invention.

Similar parts in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

This disclosure details the integration of sensors within a pumping system to create a controlled, closed loop system that accurately controls the VFD/VSD, exports performance data to the Cloud and/or Internet to allow remote manual monitoring, provides predictive/prescriptive monitoring of the pump units status and sensed parameters, and sends alerts or maintenance requests when necessary. By way of example, the controlled, closed loop system is understood to include, or take the form of, an automatic control system in which the pumping system's operation, processor or mechanism is regulated by feedback, e.g., including from some combination of the integrated sensors, Cloud-based condition monitoring, and/or user/operator remote monitoring or control.

Figure 1:
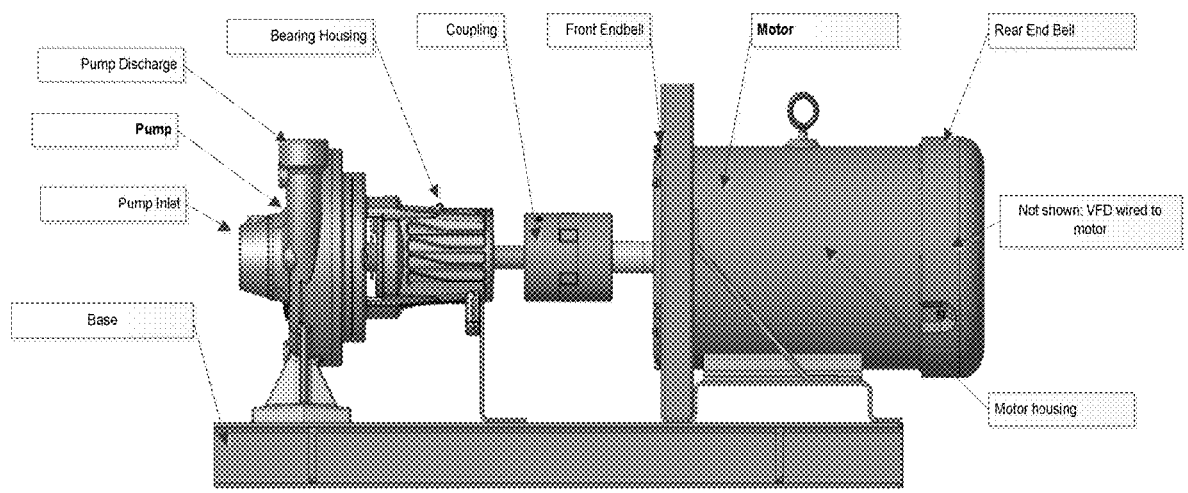
FIG. 1 shows a typical pump assembly arranged on a base, e.g., having a pump with a pump inlet, a pump discharge; a motor having a motor with a front end bell and a rear end bell arranged on each end; and a bearing housing and a coupling device for coupling the pump and motor together.
Figure 2:
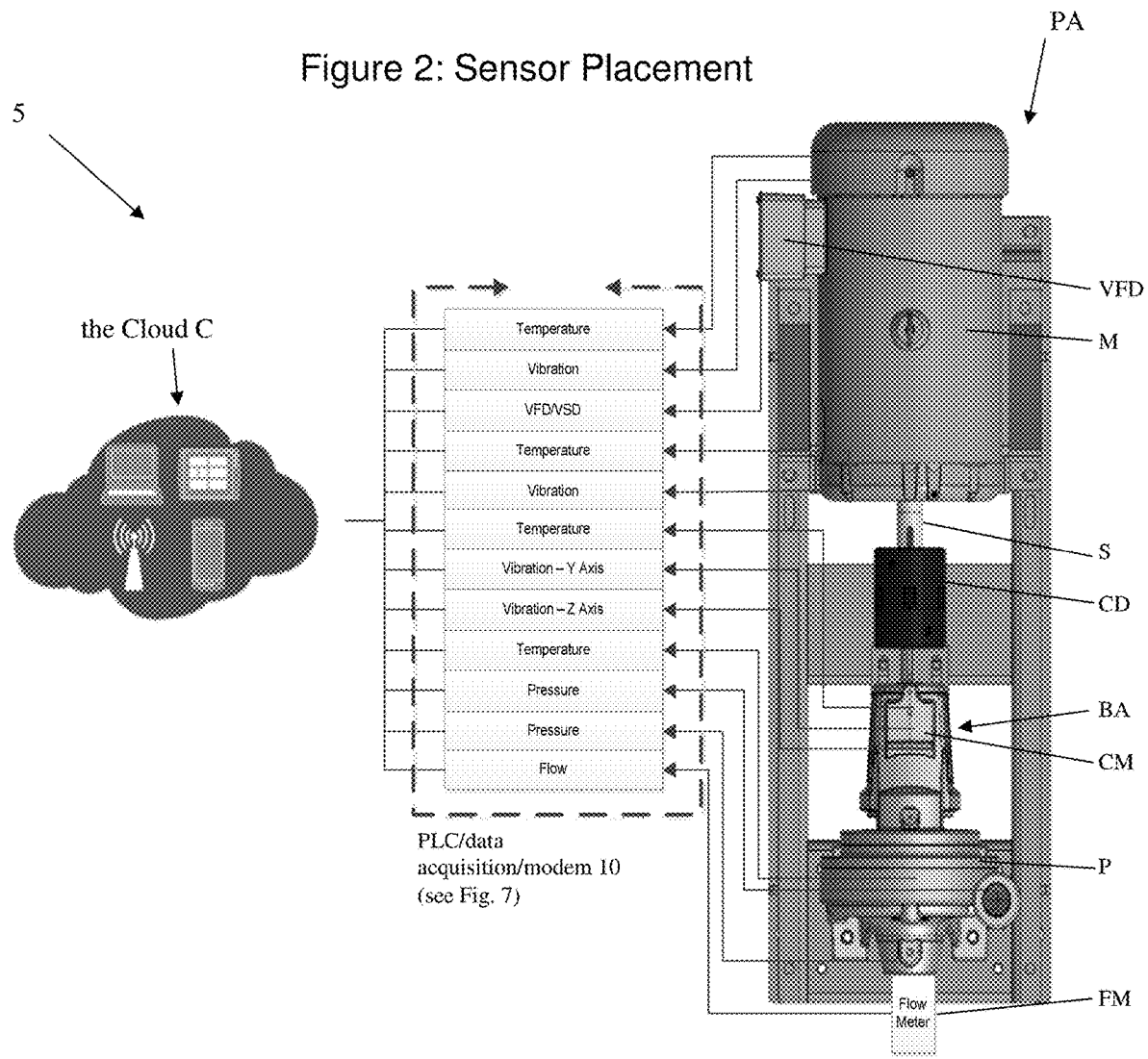
FIG. 2 shows the Cloud and a pumping system having a combined programmable Logic Controller (PLC), data acquisition and modem for receiving data acquisition system signaling from a system of integrated sensors having sensor placements that includes being placed in relation to the pump, the bearing assembly, and motor, according to some embodiments of the present invention.

FIG. 2 shows a pumping system generally indicated as 5, e.g., including a combined PLC, data acquisition system and modem 10 for coupling a pumping assembly PA to the Cloud C and/or Internet. The pumping assembly PA may include a pump P, a motor M, a coupling device CD, a bearing assembly BA and a shaft S connected between the motor and pump P. In effect, FIG. 2 outlines the inclusion of integrated sensors in the pumping assembly PA, e.g., including a condition monitoring device CM coupled to the bearing assembly BA for monitoring temperature and vibration (X/Y/Z axes), and a flow meter FM coupled to the pump P to allow for communication of status and parameter information in the pumping unit/system 5 to the user/operator, e.g., via a Cloud-based data acquisition and provisioning scheme. The PLC, data acquisition system and modem 10 may be configured to receive the status and/or sensed parameter information, e.g., in response to the provisioning of data acquisition system signaling to the integrated sensors, or the VFD/VSD, or both, etc. By way of example, FIG. 2 provides a list of sensors that the PLC, data acquisition system, modem 10 receives data acquisition system signaling from, and that may be used in the pumping system 5; which is not necessarily deemed to be a complete list and is provided by way of example only. By way of further example, the integrated sensors may include temperature, pressure and flow sensors placed or configured in relation to the pump P; temperature and vibration sensors like element CM (X/Y/Z axes) placed or configured in relation to the bearing assembly BA; and temperature and vibration sensors placed or configured in relation to the motor M. (In FIG. 2, the placement or configuration of the integrated sensor is represented by the end of the arrow, e.g., consistent with that shown.) By way of still further example, the VFD/VSD may also include a circuit, circuitry or component configured to respond to data acquisition system signaling, e.g., from the PLC, data acquisition and modem 10, and provide suitable VFD/VSD data acquisition signaling, e.g., containing information about the operation of the VFD/VSD, such as the control signaling provided for driving the motor M, as well as motor signaling containing information received back from the motor M (e.g., motor voltage, motor current, etc.).

Figure 3:
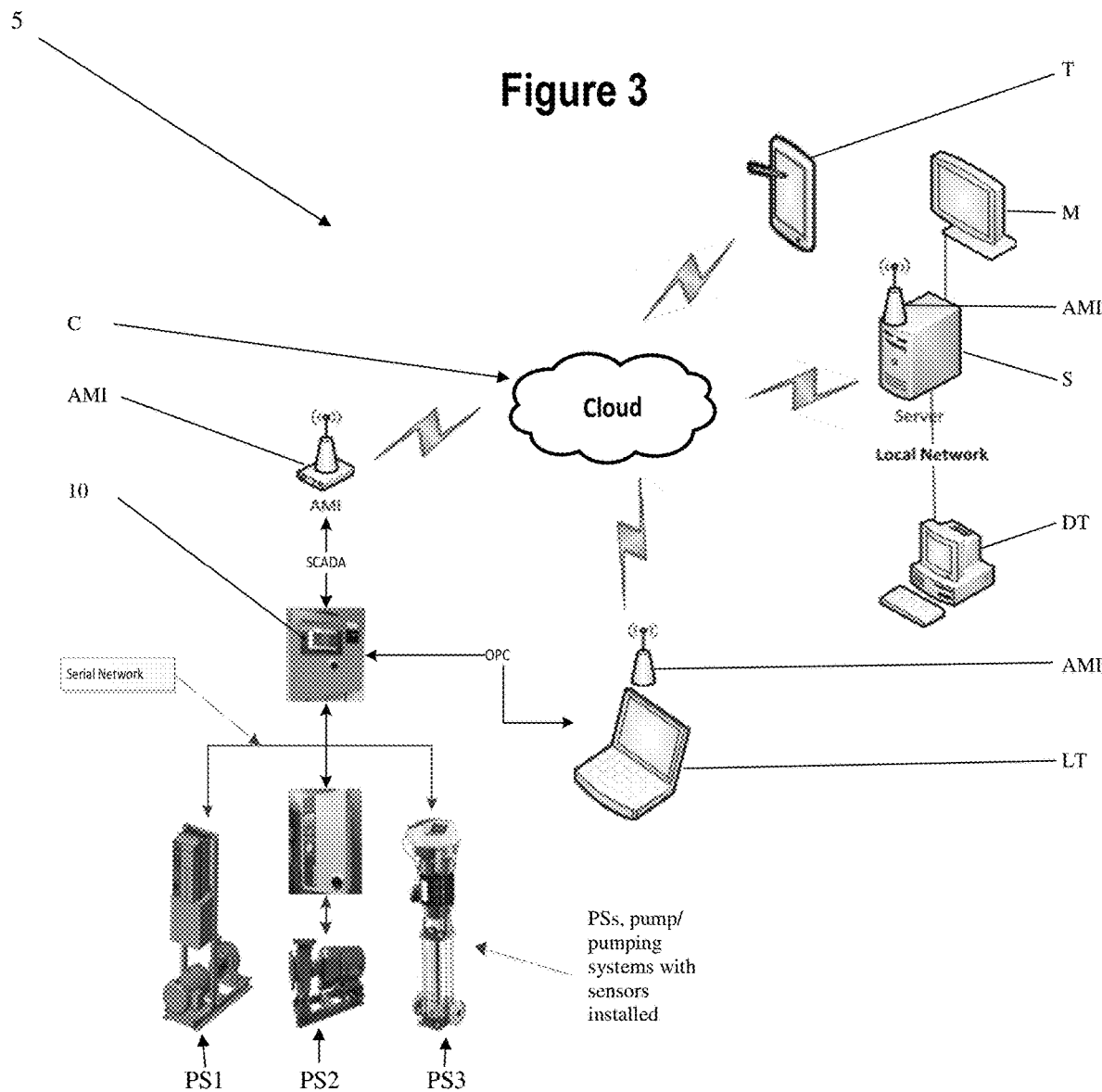
FIG. 3 shows pumping systems PS1, PS2, PS3 connected via a serial network to the combined programmable Logic Controller (PLC), data acquisition and modem to an array of communication devices (e.g., using SCADA, AMI, OPC) to the Cloud C and various computer-based devices (e.g., like a laptop LT, desktop DT, server S, tablet T), according to some embodiments of the present invention.

Furthermore, the integrated sensors placed on, or in relation to, the various components in the pumping unit/system 5 allow the pumping unit/system 5 to be connected to an array of communication devices, including but not limited to SCADA-based, AMI-based, OPC-based, Computer-based, Dataloggers, etc., e.g., like that shown in FIG. 3. These sensors are an integral part of the pumping unit/system 5 as a whole.

FIG. 3 shows how the pumping unit/system 5 may be connected to the cloud C for implementing remote monitoring and control, e.g., via the PLC, data acquisition and modem 10 using SCADA, AMI, OPC communication-based devices, e.g., to one or more devices like a laptop LT, a tablet T, a server S coupled via a local network to a desktop computer DT, etc. As shown, and by way of example, the pump systems PS1, PS2, PS3 are connected via a serial network to may be coupled to the PLC, data acquisition system, modem 10, and further connected through the PLC, data acquisition system, modem 10 to the laptop LT via or using an Open Platform Communication (OPC-based) and AMI-based communication devices/protocols to the Cloud C; and may also be connected to the server S and and tablet T via SCADA-based and AMI-based communication device/protocols to the Cloud. The server S may be coupled to the desktop DT, as shown. This Cloud-based implementation can then be connected, e.g., to a building maintenance system for monitor and control of the unit/pumping system 5 remotely. This also allows for remote monitoring and operation for the user/operator from anywhere in the world there is access to the Cloud C. For example, the user/operator can monitor run hours, speed, system pressure, etc., of the unit/pumping system 5, or the user/operator can start, stop, adjust/modify, etc. the unit/pumping system 5 as needed from anywhere they have Cloud access. This allows the user/operator to monitor the status of the unit/pumping system 5 with flexibility, so as not to be tied to any particular location. The user/operator can also remotely operate the unit/pumping system 5 and make adjustments to the pumping system settings as required. As one skilled in the art would appreciate, once user/operator adjustments are made, the VFD/VSD can implement modified or adjusted control functionality to to run the pumping system as in the controlled, closed loop system.

Figure 4:
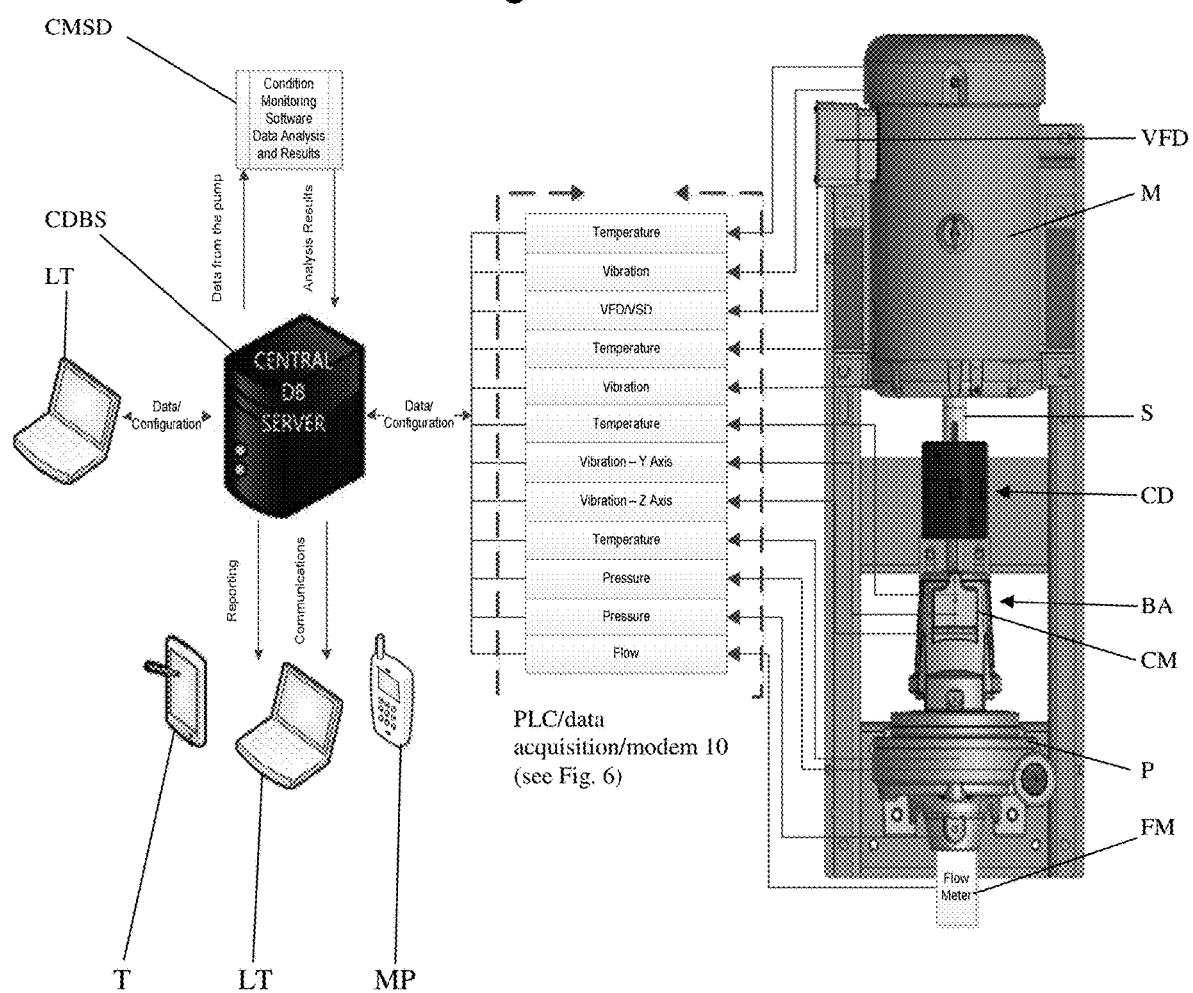
FIG. 4 shows a pumping system coupled to a combined PLC, data acquisition and modem for receiving data acquisition system signaling from a system of sensors like that shown in FIG. 2, where the combined PLC, data acquisition and modem is connected to a central database (DB) for exchanging data/configuration signaling, e.g., that is coupled to a condition monitoring software that receives data signaling from the pump/pumping system and provides analysis results signaling, that is coupled to a computer for exchanging data/configuration signaling, that is also coupled to a laptop for exchanging data/configuration signaling, and that is also coupled to a tablet, a laptop or mobile phone that receive reporting and communications signaling, all according to some embodiments of the present invention.

FIG. 4 shows how sensor integration allows for the unit/pumping system 5 to be connected to a Condition Monitoring software device CMSD for implementing pump system condition monitoring. This software may be implemented to monitor the status of the unit/pumping system 5 and compare this status information to historical data to provide predictive/prescriptive analysis for the user/operator to make determinations regarding the maintenance of the unit/pumping system 5. This allows the user/operator to service the pump P prior to conditions that would previously lead to pump failure and costly shut downs due to needed maintenance. Simply put, condition monitoring collects the data from the unit/pumping system 5 and runs the data through an algorithm to provide analysis that compares the history of the data versus the current status. This analysis is able to tell if the conditions have changed and the unit/pumping system 5 has deviated from its normal operating conditions. The user/operator then can be updated and provided with a report to allow them to understand the status of the unit/pumping system 5. Savings are also recognized in that maintenance is conducted prior to major mechanical issues and is there for proactive versus reactive. This allows the user/operator to proactively provide appropriate maintenance for the unit/pumping unit 5.

In FIG. 4, the PLC, data acquisition system, modem 10 is configured to couple a central database (DB) server CDBS to the pumping assembly PA, e.g., and exchange data/configuration signaling to implement the present invention. The central database server CDBS may be coupled/connect to various types of components, e.g., including a mobile phone MP, a laptop LT, a tablet T, for receiving reporting and communication signaling for a mobile user/operator/monitor. The central database server CDBS may also be coupled/connect to various other types of components, e.g., including a laptop for exchanging data/configuration signaling, as well as the condition monitoring software device CMSD for receiving/exchanging data signaling from the pump P and providing/exchanging analysis results signaling, all according to some embodiments of the present invention.

Figure 5:
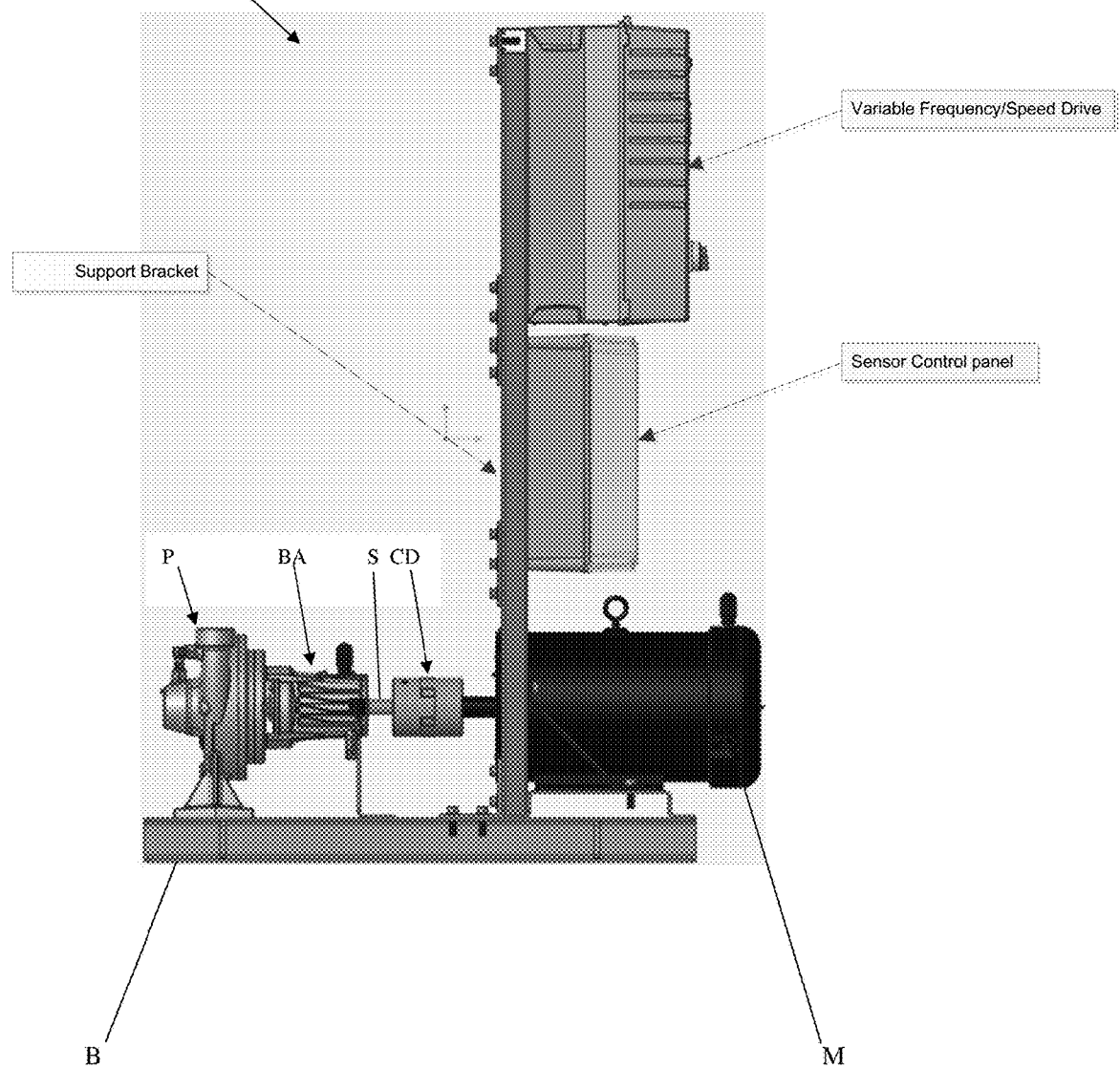
FIG. 5 shows a pump/pumping assembly with a VFD/VSD support bracket having a sensor control panel and VFD/VSD mounted thereon, according to some embodiments of the present invention.

FIGS. 5 and 6 show shows various pumping units/systems with a fixed mounting method for the VFD/VSD and any sensor processing equipment to be integrated into the pump assembly. For example, FIG. 5 shows a pumping system 5 having a pumping assembly with the pump P, the bearing assembly BA, the shaft S, the coupling device CD and the motor M are arranged/configured on a base B. The base B has a support bracket extending vertically from it, e.g., having a sensor control panel and a VFD/VSD mounted thereon. By way of example, the sensor control panel may include the PLC, data acquisition, modem 10. FIG. 6 show various pumping units/systems with the built-in VFD/VSD mounting arrangement/configuration.

FIG. 7: Implementation of Signal Processing Functionality

By way of example, FIG. 7 shows the PLC, data acquisition, modem 10 according to some embodiments of the present invention, e.g., featuring a signal processor or processing module 10a configured at least to:
provide PLC data acquisition signaling and receive the integrated data acquisition signaling, e.g., back from motor, pump and bearing assembly sensors, as well as from the VFD/VSD,
provide PLC data acquisition modem signaling that exports performance data to the Internet and/or Cloud to allow remote manual monitoring of the pump system, e.g., including in response to cloud-based PLC data acquisition modem request signaling received from the Cloud or Internet, and provide the PLC control signaling to control the VFD/VSD and operate the pumping system as a controlled, closed loop system, e.g., including in response to cloud-based VFD/VSD control signaling received from the Cloud or Internet.

In operation, the signal processor or processing module may be configured to provide the corresponding signaling as control signaling. The corresponding signaling may contain information used to control a pumping hydronic system.

The signal processor or processing module 10a may be configured in, or form part of, the PLC data acquisition system, e.g., which may include or be implemented in conjunction with a VFD/VSD control configured therein.

By way of example, the functionality of the PLC, data acquisition, modem 10 may be implemented using hardware, software, firmware, or a combination thereof. In a typical software implementation, the PLC, data acquisition, modem 10 would include one or more microprocessor-based architectures having, e.g., at least one signal processor or microprocessor like element 10a. One skilled in the art would be able to program with suitable program code such a microcontroller-based, or microprocessor-based, implementation to perform the functionality described herein without undue experimentation. For example, the signal processor or processing module 10a may be configured, e.g., by one person skilled in the art without undue experimentation, to provide PLC data acquisition signaling and receive the integrated data acquisition signaling, e.g., back from motor, pump and bearing assembly sensors, as well as from the VFD/VSD, consistent with that disclosed herein.

Moreover, the signal processor or processing module 10a may be configured, e.g., by one skilled in the art without undue experimentation, to provide PLC data acquisition modem signaling that exports performance data to the Internet to allow remote manual monitoring of the pump system, e.g., including in response to cloud-based PLC data acquisition modem request signaling received from the Cloud, consistent with that disclosed herein. For example, the integrated data acquisition signaling received from the integrated sensors may be stored in memory, and provided to the Cloud from time-to-time, or in response to the PLC data acquisition modem request signaling received from the Cloud, consistent with that disclosed herein.

Moreover still, the signal processor or processing module 10a may be configured, e.g., by one skilled in the art without undue experimentation, to provide the PLC control signaling to control the VFD/VSD and operate the pumping system as a controlled, closed loop system, e.g., including in response to cloud-based VFD/VSD control signaling received from the Cloud, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The PLC, data acquisition, modem 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by a person skilled in the art.

Possible Applications

By way of example, possible applications of the invention may include: HVAC, potable water systems, fire suppression systems, etc.

The Scope of the Invention

Further still, the embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A pumping system comprising:
   a pump coupled to a pump shaft configured to respond to a pump shaft force applied to pump a liquid;
   a motor coupled to the pump shaft and configured to respond to a VFD/VSD control signaling and provide the pump shaft force to drive the pump shaft;
   a bearing assembly having a bearing with the pump shaft arranged therein and configured to couple the pump and the motor;
   a variable frequency/speed drive (VFD/VSD) configured to receive a PLC control signaling, and provide the VFD/VSD control signaling to drive the motor;
   an integrated data acquisition system configured to respond to a PLC data acquisition signaling, and provide an integrated data acquisition system signaling containing information about an integrated set of pumping system parameters related to the pump, the bearing assembly, the motor and the VFD/VSD in the pumping system; and
   a combined programmable logic controller (PLC), data acquisition and modem, configured to:
     provide the PLC data acquisition signaling and receive the integrated data acquisition system signaling,
     in response to a cloud-based PLC data acquisition modem request signaling received from the Internet and/or Cloud, provide a PLC data acquisition modem signaling that exports performance data, including the integrated data acquisition system signaling, to the Internet and/or Cloud to allow remote manual monitoring of the pumping system, and
     provide the PLC control signaling to control the VFD/VSD and operate the pumping system as a controlled, closed loop system.

2. A pumping system according to claim 1, wherein the integrated data acquisition system comprises integrated sensors, including:
   pump pressure, temperature and flow sensors coupled to the pump, and configured to respond to the PLC data acquisition signaling and provide pump pressure, temperature and flow integrated sensor signaling containing information about one or more pressures, temperature or flows sensed in relation to the pump;
   bearing assembly temperature and vibration sensors coupled to the bearing assembly, and configured to respond to the PLC data acquisition signaling and provide bearing assembly temperature and vibration integrated sensor signaling containing information about one or more temperatures or vibrations sensed in relation to the bearing assembly; and
   motor temperature and vibration sensors coupled to the motor, and configured to respond to the PLC data acquisition signaling and provide motor temperature and vibration integrated sensor signaling containing information about one or more temperatures or vibrations sensed in relation to the motor.

3. A pumping system according to claim 2, where the pumping system comprises
   an array of communication devices, including one or more Supervisory Control and Data Acquisition (SCADA-based) device, Computer devices, advanced metering infrastructures (AMI-based), Open Platform Communication (OPC-based) devices, Dataloggers; and
   the integrated sensors on the pump, the motor, the bearing assembly are connected via the combined programmable logic controller (PLC), data acquisition and modem to the array of communication devices.

4. A pumping system according to claim 1, wherein the VFD/VSD is configured to respond to the PLC data acquisition signaling and provide VFD/VSD data acquisition signal, including the VFD/VSD control signaling, back to the combined programmable logic controller, data acquisition and modem.

5. A pumping system according to claim 1, wherein the pumping system is configured to couple to the Cloud and/or Internet for remote monitoring and control, including where the pumping system forms part of a building, and the Cloud and/or Internet includes a building management system to monitor and control the pumping system remotely.

6. A pumping system according to claim 1, wherein the pumping system comprises a cloud-based VFD/VSD controller configured to receive the PLC data acquisition modem signaling, and provide cloud-based VFD/VSD control signaling containing information to control the VFD/VSD and operate the pumping system as the controlled, closed loop system.

7. A pumping system according to claim 1, wherein the combined programmable logic controller (PLC), data acquisition and modem is configured to respond to cloud-based VFD/VSD control signaling received from the Cloud and/or Internet, and provide the PLC control signaling to control the VFD/VSD and operate the pumping system as the controlled, closed loop system.

8. A pumping system according to claim 5, wherein the building management system is configured to receive user commands, including commands to start, stop or adjust some part of the pump system.

9. A pumping system according to claim 5, wherein the building management system is configured to receive user commands, including commands to allow a user to monitor run hours, pump speed, and/or pumping system pressure in the pumping system.

10. A pumping system according to claim 1, wherein the pumping system is coupled to a pumping system condition monitoring device configured to receive the PLC data acquisition modem signaling, and provide pumping system condition monitoring signaling containing information about condition monitoring and analysis results about the pumping system, including providing predictive/prescriptive monitoring of pump statuses and sending alerts or maintenance requests.

11. A pumping system according to claim 10, wherein the pumping system condition monitoring device is configured to monitor the status of the pump, the motor or bearing assembly and compare the status to pump, motor or bearing assembly historical data to provide predictive/prescriptive analysis for the user to make determinations regarding the maintenance of the pump, the motor or bearing assembly.

12. A pumping system according to claim 1, wherein the pumping system includes, or take the form of, an HVAC system, a potable water system, a fire suppression system, or a building system.

13. A cloud-based pumping system monitoring and controlling system for remotely monitoring and controlling at least one pump, comprising:
at least one pump having a variable speed drive (VSD) and integrated sensors for monitoring pump parameters, and for providing, to a remote cloud-based server, an integrated sensor signaling containing information about pump parameters sensed for the at least one pump, including run hours, a speed and a system pressure, in response to a data acquisition request signaling received from the remote cloud-based server;
a bi-directional network for communicating the integrated sensor signaling, and for receiving a remote variable speed drive control signaling for controlling the variable speed drive for the at least one pump; and
the remote cloud-based server having a historical database containing historical pump parameter data for the at least one pump, configured to receive the integrated sensor signaling, compare the pump parameters received to the historical pump parameter data stored for each the at least one pump, and provide the remote variable speed drive control signaling for controlling the variable speed drive for the at least one pump in a controlled closed loop system that allows a remote user manual monitoring using predictive/prescriptive monitoring algorithms, including starting or stopping the at least one pump, making adjustments to pump control settings, and sending alerts or maintenance requests, when needed.

14. A cloud-based pumping system monitoring and control system according to claim 13, wherein the at least one pump comprises multiple pumps.

15. A cloud-based pumping system monitoring and control system according to claim 13, wherein the bi-directional network comprises a supervisory control and data acquisition (SCADA) coupled to the at least one pump, and an advanced metering infrastructure (AMI) coupled to the SCADA for providing cloud-based SCADA/AMI signaling for communicating the integrated sensor signaling, and for receiving the remote variable speed drive control signaling for controlling the variable speed drive for the at least one pump.

* * * * *